(12) United States Patent
Haigh

(10) Patent No.: US 10,774,796 B2
(45) Date of Patent: Sep. 15, 2020

(54) EGR VALVE WITH INTEGRATED SENSOR

(71) Applicant: Perkins Engines Company Limited, Peterborough (GB)

(72) Inventor: Edward Haigh, Peterborough (GB)

(73) Assignee: Perkins Engines Company Limited, Peterborough (GB)

(*) Notice: Subject to any disclaimer, the term of this patent is extended or adjusted under 35 U.S.C. 154(b) by 17 days.

(21) Appl. No.: 16/090,745

(22) PCT Filed: Apr. 5, 2017

(86) PCT No.: PCT/GB2017/050950
§ 371 (c)(1),
(2) Date: Oct. 2, 2018

(87) PCT Pub. No.: WO2017/178795
PCT Pub. Date: Oct. 19, 2017

(65) Prior Publication Data
US 2019/0113010 A1 Apr. 18, 2019

(30) Foreign Application Priority Data
Apr. 11, 2016 (GB) .................................. 1606126.9

(51) Int. Cl.
*F02M 26/00* (2016.01)
*F02M 26/73* (2016.01)
(Continued)

(52) U.S. Cl.
CPC ......... *F02M 26/73* (2016.02); *F02D 41/0077* (2013.01); *F02M 26/47* (2016.02);
(Continued)

(58) Field of Classification Search
CPC ........ F02M 26/73; F02M 26/65; F02M 26/51; F02M 26/48; F02M 26/66; F02M 26/47;
(Continued)

(56) References Cited

U.S. PATENT DOCUMENTS 4,406,161 A * 9/1983 Locke ..................... G01F 1/88
                                                        73/114.33
4,555,952 A * 12/1985 Jenkins .................. G01F 1/383
                                                        73/718
(Continued)

FOREIGN PATENT DOCUMENTS

DE     102013208797 A1    2/2014
WO       WO 00/31402 A1    6/2000
WO     WO 2010035554 A1    4/2010

OTHER PUBLICATIONS

International Search Report for related International Application No. PCT/GB2017/050950; report dated Jun. 20, 2017.
(Continued)

Primary Examiner — Phutthiwat Wongwian
Assistant Examiner — Sherman D Manley

(57) ABSTRACT

A valve assembly comprises: a valve housing comprising an interior cavity having upstream side and a downstream side; and a valve member movable within the valve housing between a closed position in which flow between the upstream side and the downstream side is prevented or substantially prevented and one or more open positions in which flow between the upstream side and the downstream side is enabled. The valve assembly further comprises: a sensor mounting flange on an exterior surface of the valve housing; a first bore in the valve housing linking the upstream side of the valve housing and the sensor mounting flange; and a second bore in the valve housing linking the downstream side of the valve housing and the sensor mounting flange; such that a sensor configured to measure a differential between the upstream side and the downstream side is mountable directly on the valve assembly.

15 Claims, 1 Drawing Sheet

(51) Int. Cl.
    *G01F 1/34*           (2006.01)
    *F02M 26/47*        (2016.01)
    *F02M 26/66*        (2016.01)
    *F02M 26/65*        (2016.01)
    *F02D 41/00*        (2006.01)
    *F02M 26/48*        (2016.01)
    *F02M 26/51*        (2016.01)
    *F01P 7/14*            (2006.01)

(52) U.S. Cl.
    CPC ............ *F02M 26/48* (2016.02); *F02M 26/51* (2016.02); *F02M 26/65* (2016.02); *F02M 26/66* (2016.02); *G01F 1/34* (2013.01); *F01P 2007/146* (2013.01); *Y02T 10/47* (2013.01)

(58) Field of Classification Search
    CPC ........... F02M 2026/002; F02D 41/0077; F01P 2007/146; F01P 3/00; G01F 1/34; Y02T 10/47
    See application file for complete search history.

(56) References Cited

U.S. PATENT DOCUMENTS

| | | | | |
|---|---|---|---|---|
| 5,613,479 | A * | 3/1997 | Gates | F02D 41/0072 123/568.27 |
| 6,014,961 | A * | 1/2000 | Gates | F02M 35/10222 123/497 |
| 6,415,777 | B1 * | 7/2002 | Gagnon | F02M 26/48 123/568.29 |
| 6,539,968 | B1 | 4/2003 | White et al. | |
| 6,810,725 | B2 * | 11/2004 | Henderson | G01F 1/44 73/114.74 |
| 6,837,227 | B2 | 1/2005 | Jaliwala | |
| 6,848,434 | B2 | 2/2005 | Li et al. | |
| 6,886,544 | B1 * | 5/2005 | Bui | F02M 35/10118 123/568.17 |
| 7,131,451 | B2 * | 11/2006 | Nugent | G01F 1/42 137/12 |
| 7,290,528 | B2 * | 11/2007 | Minegishi | F02D 41/0072 123/399 |
| 7,320,220 | B1 * | 1/2008 | Atkinson | G01F 1/50 60/605.2 |
| 7,946,117 | B2 * | 5/2011 | Atkinson | F01N 3/0205 123/568.19 |
| 7,950,377 | B2 | 5/2011 | Busato et al. | |
| 8,112,182 | B2 * | 2/2012 | Tokuhisa | G01F 1/6842 700/121 |
| 9,188,989 | B1 * | 11/2015 | Mudd | G05D 7/0635 |
| 9,234,476 | B2 | 1/2016 | Hakeem et al. | |
| 9,291,097 | B2 * | 3/2016 | Roozenboom | F02B 77/11 |
| 9,347,402 | B2 * | 5/2016 | Emerick | F02M 26/47 |
| 9,638,559 | B1 * | 5/2017 | Zummo | F02M 26/47 |
| 9,958,302 | B2 * | 5/2018 | Mudd | F16K 37/005 |
| 2006/0124173 | A1 * | 6/2006 | An | G05D 7/0635 137/487.5 |
| 2009/0084193 | A1 * | 4/2009 | Cerabone | F02M 26/47 73/861.64 |
| 2009/0229583 | A1 * | 9/2009 | Kotooka | F02D 21/08 123/568.18 |
| 2010/0005904 | A1 * | 1/2010 | Igarashi | G01F 1/42 73/861.61 |
| 2010/0154758 | A1 * | 6/2010 | Schneider | G01F 1/44 123/568.12 |
| 2010/0154895 | A1 * | 6/2010 | Igarashi | G01F 1/42 137/87.04 |
| 2012/0180876 | A1 * | 7/2012 | Hayashi | G01F 1/36 137/486 |
| 2012/0227399 | A1 | 9/2012 | Karch | |
| 2013/0092256 | A1 * | 4/2013 | Yasuda | G01F 1/696 137/487 |
| 2013/0167811 | A1 * | 7/2013 | Leustek | F02M 26/47 123/568.11 |
| 2014/0069527 | A1 * | 3/2014 | Mudd | G05D 7/0635 137/487 |
| 2014/0352917 | A1 | 12/2014 | Roozenboom | |
| 2015/0059713 | A1 * | 3/2015 | Forshier | F02M 35/10222 123/568.11 |
| 2016/0010598 | A1 | 1/2016 | Simons et al. | |
| 2016/0041564 | A1 * | 2/2016 | Mudd | G05D 7/0641 700/275 |
| 2016/0230682 | A1 | 8/2016 | Hagner et al. | |
| 2017/0009635 | A1 * | 1/2017 | Mitsuda | B60K 13/04 |
| 2018/0135570 | A1 * | 5/2018 | Herbert | F02M 26/73 |

OTHER PUBLICATIONS

United Kingdom Search Report for related GB Application No. 1606126.9 report dated Oct. 11, 2016.

* cited by examiner

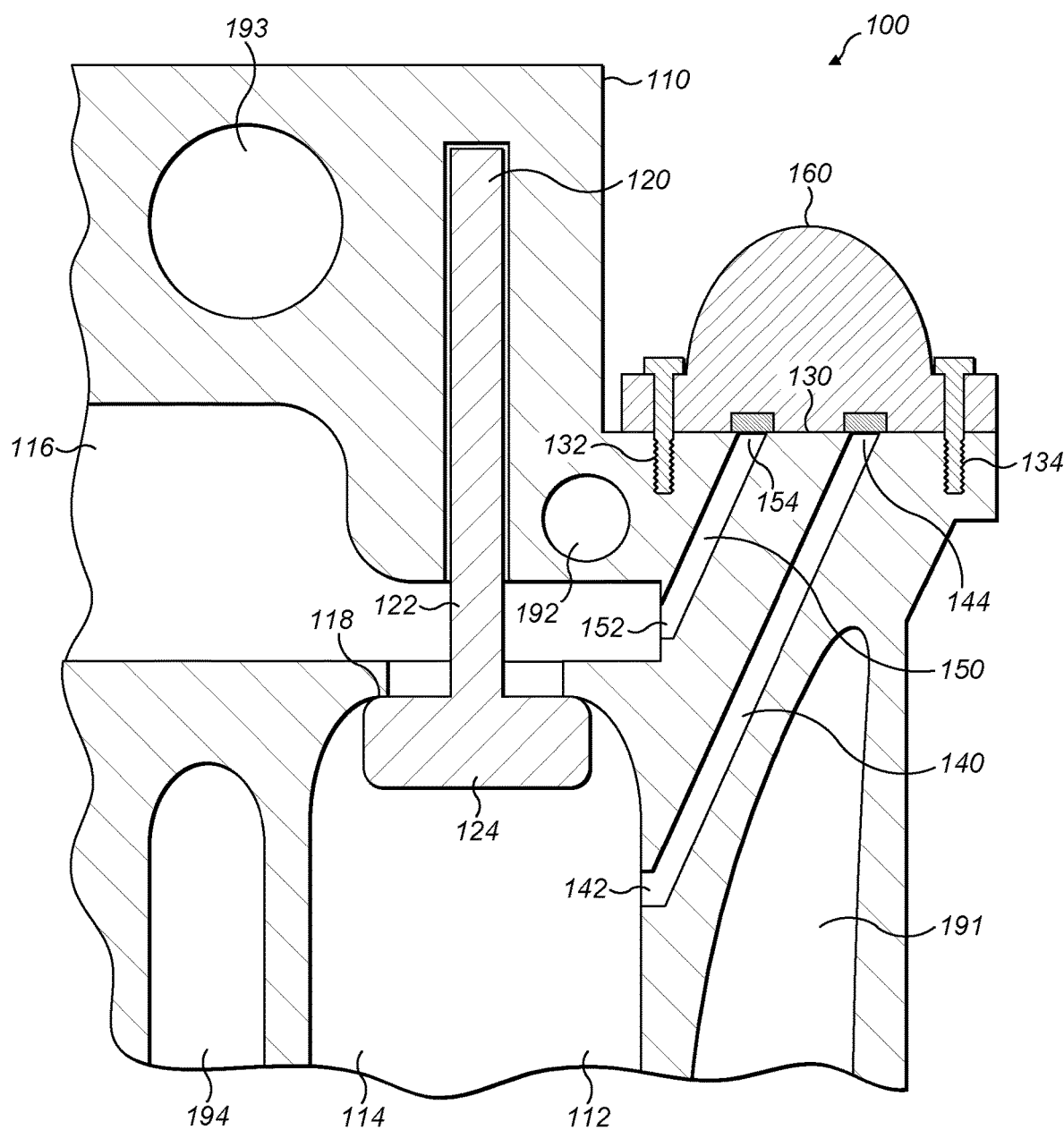

EGR VALVE WITH INTEGRATED SENSOR

CROSS-REFERENCE TO RELATED APPLICATION

This Application is a 35 USC § 371 US National Stage filing of International Application No. PCT/GB2017/050950 filed on Apr. 5, 2017 which claims priority under the Paris Convention to United Kingdom Patent Application No. 1606126.9 filed on Apr. 11, 2016.

TECHNICAL FIELD

The disclosure relates to exhaust gas recirculation in internal combustion engines.

BACKGROUND

In an internal combustion engine, it is known to recirculate exhaust gas from an exhaust manifold to an intake manifold. This may be performed as part of a strategy to reduce NOx emissions. Recirculating exhaust gas may be achieved by providing an exhaust gas recirculation passage between the exhaust manifold and the intake manifold. The exhaust gas recirculation passage may comprise an exhaust gas recirculation valve that controls the amount of gas that can flow in the exhaust gas recirculation passage. The exhaust gas recirculation valve may be fully closed such that no exhaust gas recirculation takes place.

Control of the exhaust gas recirculation valve may be undertaken by an engine control unit (ECU). The ECU may receive various inputs as part of a strategy that governs control of the position of the exhaust gas recirculation valve. A measured pressure differential between the exhaust manifold side of the EGR valve and the intake manifold side of the valve may be one of the inputs that is used to influence control of the position of the EGR valve.

The temperature of recirculating exhaust gas can be high. High temperatures may affect the ability of a pressure sensor to function reliably and to provide an accurate output. It is known, for this reason, to locate a pressure sensor remotely from the EGR valve on a dedicated manifold and to transfer gas pressure from either side of the EGR valve to the remotely mounted pressure sensor via transfer tubes. All of this additional hardware has an associated cost.

SUMMARY OF DISCLOSURE

There is provided a valve assembly comprising:
a valve housing comprising an interior cavity having upstream side and a downstream side;
a valve member movable within the valve housing between a closed position in which flow between the upstream side and the downstream side is prevented or substantially prevented and one or more open positions in which flow between the upstream side and the downstream side is enabled;
a sensor mounting flange on an exterior surface of the valve housing;
a first bore in the valve housing linking the upstream side of the valve housing and the sensor mounting flange; and
a second bore in the valve housing linking the downstream side of the valve housing and the sensor mounting flange;

such that a sensor configured to measure a differential between the upstream side and the downstream side is mountable directly on the valve assembly.

BRIEF DESCRIPTION OF THE DRAWING

FIG. 1 shows a cross-sectional view of a valve assembly in accordance with the disclosure.

DETAILED DESCRIPTION

FIG. 1 shows a cross-sectional view of a valve assembly 100 in accordance with an embodiment of the disclosure.

The valve assembly 100 comprises a valve housing 110 comprising an interior cavity 112 having upstream side 114 and a downstream side 116. The valve assembly 100 also comprises a valve member 120 movable within the valve housing 110. The valve member 120 may comprise a valve stem 122 and a valve head 124. The valve housing 110 may be of a cast and/or machined block of an alloy material.

The valve housing 110 may comprise a valve seat 118 within the interior cavity 112. The valve seat 118 may comprise a surface configured to receive the valve head 124 when the valve stem 112 is in a closed position (as shown in FIG. 1) to form a seal between the valve head 124 and the valve seat 118. As such, in the closed position, there is no passage for flow of fluid past the valve head 124 from the upstream side 114 to the downstream side 116 of the interior cavity.

Movement of the valve member 120 into an open position means that the valve head 124 ceases to make sealed contact with the valve seat 118 such that flow of fluid past the valve head 124 is enabled. In this way, fluid may flow from the upstream side 114 to the downstream side 116 of the interior cavity.

The valve assembly 100 further comprises a sensor mounting flange 130 on an exterior surface of the valve housing 110. The sensor mounting flange 130 may comprise a substantially flat surface that is horizontal in an orientation of use. The sensor mounting flange 130 may also comprise a pair of threaded holes each configured to receive a threaded fastener, such as a bolt, to enable a sensor to be fixedly attached to the sensor mounting flange 130.

The valve assembly 100 further comprises a first bore 140 in the valve housing 110 that inks the upstream side 114 of the cavity 112 of the valve housing 110 and the sensor mounting flange 130. The valve assembly 100 further comprises a second bore 150 in the valve housing 110 that links the downstream side 114 of the cavity 112 of the valve housing 110 and the sensor mounting flange 130.

The first bore 140 may have a first end 142 adjacent the upstream side 112 of the cavity of the valve housing 110 and a second end 144 adjacent the sensor mounting flange 130. Similarly, the second bore 150 may have a first end 152 adjacent the downstream side 116 of the cavity 112 of the valve housing 110 and a second end 154 adjacent the sensor mounting flange 130.

In this way, the first bore 140 is at substantially the same pressure as the upstream side 112 of the valve housing 110. Similarly, the second bore 150 is at substantially the same pressure as the downstream side 114 of the valve housing 110.

A differential pressure sensor 160 that is configured to measure a pressure difference between a first port and a second port may be fasted to the sensor mounting flange 130 such that the first port of the pressure mounting sensor 160 is aligned with the first bore 140 and the second port of the pressure mounting sensor 160 is aligned with the second bore 150.

Since the sensor mounting flange 130 (and any sensor mounted thereon) may be some distance from the from the upstream and downstream sides 114, 116 of the interior cavity 112, the temperature of gas at the second ends 144, 154 of the first and second bores 140, 150 may be lower than in the interior cavity 112. This may be in part because the valve housing 110 has a high thermal mass that conducts heat away from the vicinity of the first and second bores 140, 150. However, it may be that a further reduction in temperature at the ends of the first and second bores 140, 150 adjacent the sensor mounting flange 130 is desirable in order to maximise the reliability of pressure differential readings provided by the differential pressure sensor 160.

The valve assembly 100 may therefore comprise a coolant channel arrangement 191, 192, 193, 194. The coolant channel arrangement 191, 192, 193, 194 may surround at least one of the first and second bores 114, 116 to facilitate thermal transfer between at least one of the first and second bores and the coolant channel. Alternatively, or in addition, the coolant channel arrangement 191, 192, 193, 194 may be located adjacent the sensor mounting flange 130 such that thermal transfer may be effected away from the sensor itself.

The coolant channel arrangement 191, 192, 193, 194 may comprise one or more of: a plurality of channels in series; a plurality of channels in parallel; a coolant jacket.

The coolant channel arrangement 191, 192, 193, 194 may be separate from or integrated with an exhaust gas recirculation cooler configured to cool exhaust gas in other parts of an exhaust gas cooler module to which the valve assembly may be attached or of which it may be a part.

The sensor mounting flange 130 is located above (in an orientation of use) a location at which the first bore 140 meets the interior cavity 112 of the valve housing 110 and is above a location at which the second bore 150 meets the interior cavity 112 of the valve housing 110. The first and second bores 140, 150 each have a component of direction downwards away from the sensor mounting flange 130. In this way, any condensate formation may drain away from the sensor mounting flange 130 and hence away from a sensor 160 mounted on the sensor mounting flange 130. The first and second bores 140, 150 may each be arranged such that at least a major component of each bore is configured to have an axial direction that makes an angle with the sensor mounting flange 130 of at least 60° and more preferably approximately 70°. Accordingly, where the sensor mounting flange is horizontal in an orientation of use, the first and second bores each have a greater component of direction in a vertical than in a horizontal direction.

The sensor mounting flange 130 may comprise first and second fastener receiving features 132, 134 in the form of threaded holes. Each threaded hole 132, 134 may be configured to receive a fastener for fastening a sensor to the sensor 160 mounting flange 130.

In the illustrated embodiment, the second ends 144, 154 of the first and second bores may be aligned with the two threaded holes 132, 134 such that the centres of all four intersect with a single centre line.

There may be one or more orientation features on the sensor mounting flange 130 to ensure that the sensor 160 is mounted in its intended orientation.

The valve assembly may be an exhaust gas recirculation (EGR) valve assembly. Accordingly, the temperature of exhaust gas in the interior cavity 112 of the valve housing 110 may be of the order of 500° C. A pressure differential sensor may be configured to work reliably at temperatures significantly lower than 500° C. Accordingly, it may be that significant thermal transfer capacity is required for transferring thermal energy away from the sensor 160 and the sensor mounting flange 130.

The diameter of the first and second bores 140, 150 may be selected to reduce the likelihood of condensate fluid remaining in the bores, for example as a consequence of surface tension considerations. Accordingly, an internal diameter of each of the first and second bores 140, 150 may be of the order of 6 mm. Alternatively, the internal diameter may be of the order of 8 mm. In a specific embodiment, the internal diameter may be approximately 6.4 mm.

The first and second bores 140, 150 may be formed by machined holes in the valve housing 110. The first and second bores 140, 150 may each be formed from a single machined hole or may each be formed from a pair of machined holes, one starting at the first end 142, 152 and the other starting at the second end 144, 154. In the event that the first and second bores 140, 150 are formed from a pair of machined holes, one starting at the first end 142, 152 and the other starting at the second end 144, 154, it may be that the machined holes starting at the first end 142, 152 are those having their axial direction which makes an angle with the sensor mounting flange 130 of at least 60° and more preferably approximately 70°.

Alternatively, the first and second bores 140, 150 may be otherwise formed in the valve housing 110.

In an alternative arrangement, the sensor mounting flange may be configured to receive two pressure sensors, wherein one pressure sensor is configured to measure pressure from the first bore and the other pressure sensor is configured to measure pressure from the second bore. A difference in pressure between the first bore and the second bore may then be calculated as a difference between the readings of the first and second pressure sensors.

The valve assembly of the present disclosure is not limited to receiving one or more pressure sensors. Rather, it may be appropriate for receiving an alternative sensor for sensing one or more alternative properties of the upstream side 114 and the downstream side 116 of the cavity.

INDUSTRIAL APPLICABILITY

The valve assembly of the present disclosure may be used to mount a sensor 160 directly to the valve assembly 100 rather than mounting a sensor remotely from the valve assembly. This may contribute to reduced component count.

The invention claimed is:
1. A valve assembly comprising:
a valve housing comprising an interior cavity having an upstream side disposed upstream of a valve member and a downstream side disposed downstream of the valve member;
the valve member movable within the valve housing between a closed position in which flow between the upstream side and the downstream side is prevented or substantially prevented and one or more open positions in which flow between the upstream side and the downstream side is enabled;
a sensor mounting flange on an exterior surface of the valve housing;
a first bore in the valve housing linking the upstream side of the valve housing and the sensor mounting flange; and a second bore in the valve housing linking the downstream side of the valve housing and the sensor mounting flange;

such that a sensor configured to measure a differential between the upstream side and the downstream side is mountable directly on the valve assembly.

2. The valve assembly of claim 1 wherein the sensor mounting flange is substantially planar.

3. The valve assembly of claim 1 wherein, in an orientation of use, the sensor mounting flange is above a location at which the first bore meets the interior cavity of the valve housing and is above a location at which the second bore meets the interior cavity of the valve housing, wherein the first and second bores each have a component of direction downwards away from the sensor mounting flange.

4. The valve assembly of claim 1 wherein the sensor mounting flange comprises one or more fastener receiving features configured to receive one or more fasteners for fastening a sensor to the sensor mounting flange.

5. The valve assembly of claim 4 wherein, at a plane of the sensor mounting flange, a centre of the first bore, a centre of the second bore and a centre of each of a pair of fastener receiving features are all aligned along a single straight line.

6. The valve assembly of claim 1 wherein the sensor mounting flange comprises one or more orientation features to facilitate mounting of a sensor to the sensor mounting flange in a single orientation.

7. The valve assembly of claim 1 wherein the valve assembly is an exhaust gas recirculation valve assembly.

8. An exhaust gas recirculation valve comprising a valve assembly of claim 1.

9. A valve assembly comprising:
a valve housing comprising:
an interior cavity having upstream side and a downstream side; and
a coolant channel arrangement;
a valve member movable within the valve housing between a closed position in which flow between the upstream side and the downstream side is prevented or substantially prevented and one or more open positions in which flow between the upstream side and the downstream side is enabled;
a sensor mounting flange on an exterior surface of the valve housing;
a first bore in the valve housing linking the upstream side of the valve housing and the sensor mounting flange; and
a second bore in the valve housing linking the downstream side of the valve housing and the sensor mounting flange;
such that a sensor configured to measure a differential between the upstream side and the downstream side is mountable directly on the valve assembly.

10. The valve assembly of claim 9 wherein the coolant channel arrangement surrounds at least one of the first and second bores to facilitate thermal transfer between at least one of the first and second bores and the coolant channel.

11. The valve assembly of claim 9 wherein at least a part of the coolant channel arrangement is located adjacent the sensor mounting flange.

12. The valve assembly of claim 9 wherein the coolant channel arrangement comprises one or more of:
a plurality of channels in series;
a plurality of channels in parallel;
a coolant jacket.

13. The valve assembly of claim 9 wherein the coolant channel arrangement comprises one or more channels that surround one or both of the upstream side and the downstream side of the interior cavity of the valve housing.

14. The valve assembly of claim 9 wherein the coolant channel arrangement is a part of an exhaust gas recirculation cooling circuit.

15. A valve assembly comprising:
a valve housing comprising an interior cavity having upstream side and a downstream side;
a valve member movable within the valve housing between a closed position in which flow between the upstream side and the downstream side is prevented or substantially prevented and one or more open positions in which flow between the upstream side and the downstream side is enabled;
a sensor mounting flange on an exterior surface of the valve housing;
a first bore in the valve housing linking the upstream side of the valve housing and the sensor mounting flange; and
a second bore in the valve housing linking the downstream side of the valve housing and the sensor mounting flange;
such that a sensor configured to measure a differential between the upstream side and the downstream side is mountable directly on the valve assembly,
wherein the first bore comprises a first axial direction at an end adjacent the sensor mounting flange wherein an angle between the first axial direction and the sensor mounting flange is at least 60°; and/or
the second bore comprises a second axial direction at an end adjacent the sensor mounting flange wherein an angle between the second axial direction and the sensor mounting flange is at least 60°.

* * * * *